United States Patent [19]

Dallas

[11] Patent Number: 4,612,661
[45] Date of Patent: Sep. 16, 1986

[54] SUCTION ENGAGING X-RAY CASSETTE CONTAINER

[76] Inventor: Donald W. Dallas, 641 Grovewood Dr., Gretna, La. 70053

[21] Appl. No.: 595,417

[22] Filed: Mar. 30, 1984

[51] Int. Cl.[4] .............................................. G02B 5/00
[52] U.S. Cl. .................................... 378/177; 378/167; 378/182; 378/205; 378/58; 378/59
[58] Field of Search .................. 378/58, 59, 167, 177, 378/180, 182, 205

[56] References Cited

U.S. PATENT DOCUMENTS 4,114,044  9/1978  Chiulli ................................. 378/167

*Primary Examiner*—Richard L. Schilling
*Attorney, Agent, or Firm*—Pravel, Gambrell, Hewitt & Kimball

[57] ABSTRACT

A container for radiographic film cassettes particularly adapted for adhering to surfaces. In combination, a container comprises a substantially flatened container space therein for receiving and x-ray cassette, with one end of the container permanently closed, and the second end adaptable between opened and closed positions. The container would further comprise a plurality of suction cup members substantially located at each corner of the container for suctionally adhering to the surface to be x-rayed. There is further provided a pair of handle members extending along the top side of the container for manually gripping the handle members for removing the container from the surfaced x-rayed by overcoming the suction between the container and the surface.

8 Claims, 4 Drawing Figures

U.S. Patent   Sep. 16, 1986   4,612,661
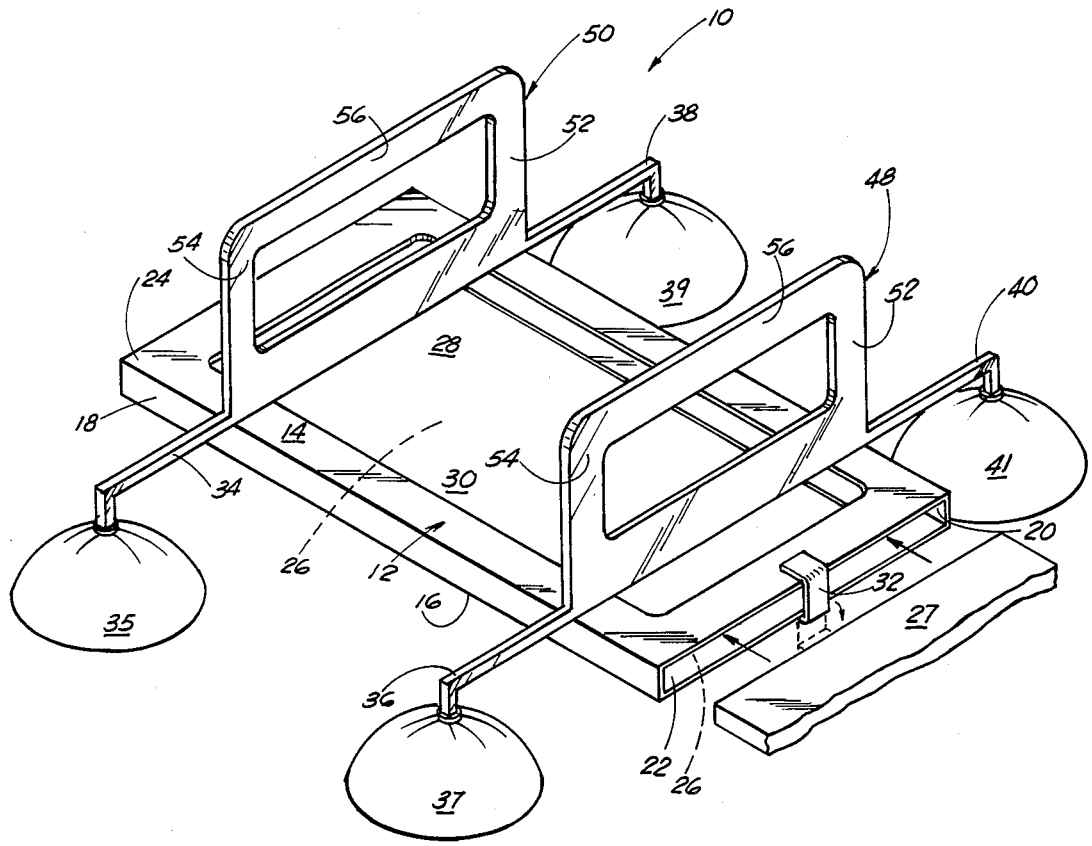
FIG. 1
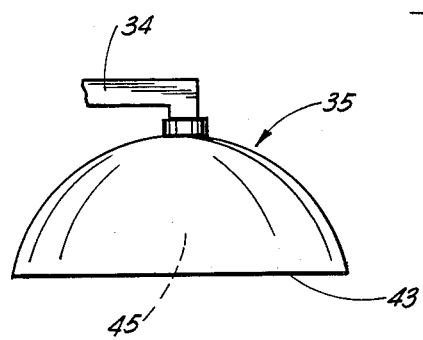
FIG. 4
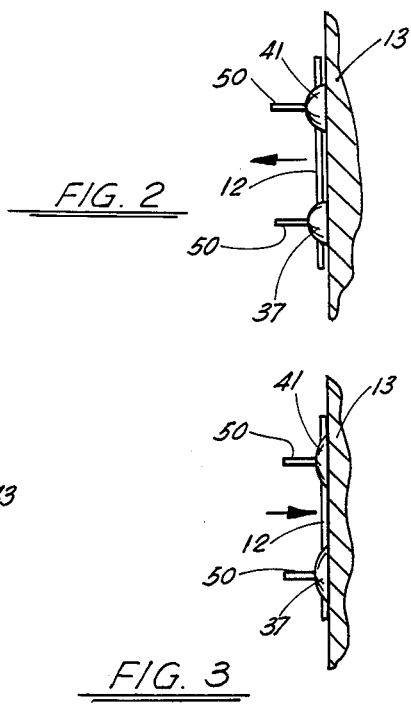
FIG. 2
FIG. 3

SUCTION ENGAGING X-RAY CASSETTE CONTAINER

BACKGROUND OF THE INVENTION

1. Field of the Invention

The apparatus of the present invention relates to x-ray film cassette containers. More particularly, the apparatus of the present invention relates to a container for an industrial x-ray cassette adapted for adhering to surfaces, particularly non-ferrous surfaces through suction members.

2. General Background

In the field of radiographic photography, cassettes are widely used for holding the x-ray sensitive film. Particularly, in the field of industrial non-destructive testing, wherein welds between sections of pipe or metal plates, must be x-rayed in order to determine if the weld is proper, or if there is other fissures in the metal, the x-ray film is loaded into a cassette so that it will be placed in a light-free environment with the item to be x-rayed. It is imperative that the cassette's placement be proper, not to be adjusted by field personnel during the exposure.

In addressing the problems that are encountered in industrial x-raying, one of such problems has been addressed by applicant in a previous application, presently pending in the U.S. Patent Office, that is, the placement of an x-ray cassette along a metalic curvatured weld in order to determine if the weld is indeed free of flaws. Applicant solved this problem by inventing a flexible cassette, which could conform to the curved metal surface, while containing an x-ray film, and adhere to the metal surface through a plurality of magnetic means along its borders, wherein the flexible cassette could be placed in any position along a curvatured or vertical weld, and solved the problem of maintaining it in position during x-ray.

In other fields of industrial x-ray, often time lightweight metals, such as aluminum or the like, are utilized in metallic structures, particularly for example in the aviation industry, where the bodies of aircraft and the like are constructed of lightweight aluminum metal, or other non-ferrous metals, and are likewise welded. For safety requirements, these types of welds must also be industrially x-rayed in order to determine their quality. However, the apparatus which is the subject of the previous patent application of applicant, i.e., magnetic members in combination with a cassette, could not be utilized in this situation since there is no magnetic contact to a non-ferrous metal. Also, the present invention may be utilized on any type of surface, ferrous surfaces included.

Several patents have been obtained in the art of cassettes for x-ray film, the most pertinent being as follows:

German patent DE-PS No. 1,112,887, relates to a cassette incorporating a sheet of elastic material which exerts magnetic contraction forces over its entire area for cooperating with an iron foil supported on the bottom of the cassette. This particular cassette is disadvantageous in that the very thin foil, which serves as a medium to which x-rays enter the internal space of a cassette, has a thermal expansion coefficient differing from that of the components on which the foil is supported, and very often becomes detached from its support folds, especially under temperature variations.

U.S. Pat. No. 2,811,251 issued to S. Yerkovich entitled "Means for Holding Cassettes In X-Ray Spot Film Devices" relates to an apparatus for holding an article within an enclosure so that spot film devices can be utilized for rapidly making radiographs. This in no way relates to a magnetic means for maintaining the cassette in place.

U.S. Pat. No. 3,499,147 issued to Goodman, et al, entitled "Cassette for Radiographic Film Material", relates to a cassette wherein a sandwich-type film holder combination with the cassette main frame is taught and adapted to compress the film holder into a light-tight structure when assembled.

U.S. Pat. No. 3,511,990 issued to Hauss entitled "Radiographic Film Cassette having A Resilient Film Release Step Therein" provides a film package or cassette having a pair of opposed interfaces. A layer of resilient material is disposed on at least one of the opposed faces and a strip of resilient material, having a greater thickness than the layer is provided along at least a portion of one edge of the layer of material so that the film contained is released from the resilient material.

U.S. Pat. No. 3,591,804 issued to Minasian entitled "Magnetically Attractive Marking Device And Holding Member For X-Ray File Holder" relates to a film holder having markers for producing identifying images on the negative, with the markers having strips of magnetic material with identifying stencil letters cut therein. This particular patent does not, however, teach adhering of the cassette to the material to be x-rayed.

U.S. Pat. No. 3,704,369 issued to Paidosh entitled "X-Ray Film Cassette" teaches the use of an improved cassette for providing improved contact between the intensifying screen and the sensitized film.

U.S. Pat. No. 3,829,699 issued to Anspach, Jr. entitled "Holder For X-Ray Cassettes" teaches the use of a cassette holder for x-ray cassettes which can be made sterile and easily used in an operating room having means for sealing the inner side of the container cap to prevent contamination.

U.S. Pat. No. 3,971,470 issued to White entitled "X-Ray Cassette Film Holder" wherein the improvement is basically a means for providing the tray and the mating lid to be automatically urged into tight engagement when they are closed together.

U.S. Pat. No. 4,114,044 issued to Chiulli entitled "Radiographic Cassette Adapter" wherein is provided a means for allowing a large x-ray film cassette holder to be fitted with the adapter for allowing the use of smaller film so that various sizes of cassettes are not necessitated.

U.S. Pat. No. 4,313,538 issued to Bauer, et al, entitled "Film Cassette With An Opening For Exposing Data On A Film Accommodated Therein" provides a cassette particularly adapted with an enclosable opening through which data can be exposed onto a pre-determined portion of the film accommodated within an internal compartment of a cassette.

U.S. Pat. No. 4,331,236 isued to Bauer entitled "Container For X-Ray Film" having a first chamber for the film and a relatively narrow elongated second chamber for housing an elongated data carrier card, the two being separate and apart.

U.S. Pat. No. 4,350,248 issued to Bauer entitled "X-Ray Film Cassette with Magnetically Attracted Confining Plates" teaches the use of a cassette having two separate parts which are connected on one side by a hinge and which are connectable on the second end with a magnetic plate supported cassette wall and attracting a ferromagnetic foil for eliminating air inclusion between the intensifying shields and the x-ray film interposed therebetween. Although this patent does teach the use of a magnetic means within the cassette, it does not address the problem of the cassette being adhered to the object being x-rayed.

U.S. Pat. No. 4,346,300 issued to Turner entitled "Film Sheet Cassette" relates to a frame wherein a pressure plate between the front and back plate is held in operative position by the force of magnetic repulsion by an array of magnetic poles between the plates. Again, like the previous patent, this patent does use magnetic means within the cassette but not means for adapting the cassette to the item being x-rayed.

SUMMARY OF THE PRESENT INVENTION

The preferred embodiment of the apparatus of the present invention solves the problems encountered in the present state of the art in a simple and straightforward manner. What is provided is a container for radiographic film cassettes particularly adapted for adhering to non-level surfaces. In combination, the container comprises a substantially flatened container space for receiving an x-ray cassette, therein with one end of the container permanently closed, and the second end adaptable between opened and closed positions. The container would further comprise a plurality of suction cup members substantially located at each corner of the container for suctionally adhering to the surface to be x-rayed. There is further provided a pair of handle members extending along the top side of the container for manually gripping the handle members for removing the container from the surfaced x-rayed by overcoming the suction between the container and the surface.

Therefore, it is an object of the present invention to provide a radiographic cassette container having the ability to adhere to surfaces to be x-rayed.

It is a further object of the present invention to provide a radiographic cassette container having means for adapting the container to the surface to be x-rayed overcoming the force of gravity.

It is a further object of the present invention to provide a radiographic film cassette container which can be secured in position and removed without the need of extraneous outside means.

In order to accomplish the above objects, it is one feature of the present invention to provide a radiographic film cassette container which defines a space therein for receiving a radiographic cassette.

It is a further feature of the present invention to provide a radiographic film cassette container having a plurality of suction members for adhering the container to a surface to be x-rayed.

It is still a further feature of the present invention to provide a radiographic film cassette container having a pair of handle members for easily removing the container from the surface following the x-ray step.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein:

FIG. 1 is an overall perspective view of the preferred embodiment of the apparatus of the present invention illustrating the apparatus adhering to the surface of an item;

FIGS. 2 and 3 are a side cross-sectional view of the preferred embodiment of the apparatus of the present invention illustrating the suction members adhering to the surface to be x-rayed; and FIG. 4 is a side view of a single suction cup member of the preferred embodiment of the apparatus of the present invention.

DETAILED DESCRIPTION OF THE PREFERRED EMBODIMENT

FIGS. 1 through 4 illustrate the preferred embodiment of the apparatus of the present invention as illustrated by the numeral 10. As seen in FIGS. 1 through 3, radiographic film cassette container apparatus 10 (hereinafter referred to as "container 10") provides a container body 12 having a top portion 14, a bottom portion 16, side wall portions 18 and 20 and end portions 22 and 24, said top, bottom, side wall and end portions defining a radiographic film cassette container space 26 therein.

In the preferred embodiment, container 10 would be constructed of durable yet possibly flexibe plastic material, which is lightweight yet can be utilized in numerous applications in the industrial x-raying field. As seen in the FIGURES, top and bottom wall portions 14 and 16 respectively, are adapted with body openings 28 and 30, which provides most of their portions x-ray cassette 27 be viewable from the exterior of the container after the placement of cassette 27 within space 26. Cassette 27 is slidably received through first end portion 22 as seen in the drawings, with end portion 22 having flexible velcro strap 32 or the like moveable between opened (phantom view) and closed positions, as seen in FIG. 1. Following the placement of cassette 27 therein, velcro strap 32 is engaged across end portion 22 for preventing the inadvertent slippage of cassette 27 out of space 26 during the x-ray process.

As is further seen in the drawings, there is integrally attached to container body 12 at each of its four corners, support members 34, 36, 38 and 40 respectively, each of said members being of the same material as container body 12, and adapted for receiving individual suction cups 35, 37, 39 and 41 respectively. Suction cups 35, 37, 39 and 41 would adhere to support members 34, 36, 38 and 40 respectively via gluing or the like, and would be rigidly mounted thereinto, as seen in FIG. 4.

As seen in the FIGURES, particularly FIGS. 2 and 3, suction cup members 35, 37, 39, and 41 are positioned so that the lowermost bottom surface 43 of each member is normally below the bottom portion 16 of container body 12, when container 12 is yet secured, so that upon the adherance of suction cup members to surface 13 to be x-rayed, the suction cup members allow for suctionally engaging the surface yet maintaining the lower portion of container body 12 still out of contact with the surface yet in close proximity thereto. It should be noted that in normal use of the apparatus, each of said suction cup members 35, 37, 39 and 41 function as a typical suction cup, i.e, creating a vacuum between the inner cup space 45 when the cups are pressed inward, and the surface 13 to be x-rayed.

Following the x-raying of the surface, container 10 can be easily removed from the surface via handle members 48 and 50, which extend substantially along the top portion 14 of container body 12, and as seen particularly in FIG. 3, are raised handle members providing a pair of engaging portions 52 and 54, and handle portion 56 extending therebetween. In utiizing the apparatus, once the x-ray has taken place, handle members 48 and 50 are manually grasped at handle 56 and is pulled away from surface 13, in order to overcome the suction created by suction cups 35, 37, 39 and 41 and surface 13.

It should be noted that this particular apparatus is very valuable in the x-raying all surfaces including metal, non-metal, non-ferrous metal, plastic or the like, and can utilized either on the horizontal, vertical or upside down plane, with the suction cups being utilized to adhere the apparatus to the surface to be x-rayed.

Because many varying and different embodiments may be made within the scope of the inventive concept herein taught, and because many modifications may be made in the embodiments herein detailed in accordance with the descriptive requirement of the law, it is to be understood that the details herein are to be interpreted a illustrative and not in a limiting sense.

What is claimed as invention is:

1. A container for housing radiographic film cassette comprising:
    a. a container portion, having top, bottom and side wall portions, defining a cassette receiving space therein, said container portion having a first end movable between opened and closed positions; and
    b. suction means adapted to said container portion for suctionally adhering said container to the surface to be x-rayed.

2. The apparatus in claim 1, further comprising handle means for disengaging said container portion from the surface to be x-rayed.

3. The apparatus of claim 1, wherein said container portion is constructed of plastic.

4. The apparatus of claim 1, wherein said suction means further comprises a plurality of suctioned cups situated substantially at each corner of said container portion for uniformly adhering said container to the surface to the x-rayed.

5. The apparatus of claim 1, further comprising a pair of handle members manually grippable for removing said container from said surface to be x-rayed.

6. An x-ray film cassette container particularly suitable for adhering to non-level surfaces to be x-rayed comprising:
    a. a container body, having a top, bottom, side wall and end wall portions, said wall portions defining container space therein with one of said wall portions movable between opened and closed positions allowing access and egress from said container space;
    b. a plurality of suction cup members at each corner of said container body, said members suctionally engaging the surface to be x-rayed for adhering thereto;
    c. handle means adapted to said container portion for manually overcoming the suction between said suction cups and said surface, for removing said container from said surface.

7. The apparatus of claim 6, wherein said container portion is constructed of plastic.

8. The apparatus of claim 6, wherein said handle means further comprises a pair of handle members manually grippable for removing said container from said surface to be x-rayed.

* * * * *